Oct. 23, 1951     R. WIDERÖE     2,572,551
MAGNETIC INDUCTION ACCELERATOR
Filed June 4, 1947     4 Sheets-Sheet 1

Inventor:
Rolf Wideröe,
By Pierce, Scheffler & Parker,
Attorneys.

Oct. 23, 1951        R. WIDERÖE        2,572,551

MAGNETIC INDUCTION ACCELERATOR

Filed June 4, 1947        4 Sheets-Sheet 2

Inventor:
Rolf Wideröe,
By: Pierce, Scheffler & Parker
Attorneys.

Oct. 23, 1951 — R. WIDERÖE — 2,572,551
MAGNETIC INDUCTION ACCELERATOR
Filed June 4, 1947 — 4 Sheets-Sheet 3

Inventor:
Rolf Wideröe,
By: Pierce, Scheffler & Parker,
Attorneys.

Oct. 23, 1951                R. WIDERÖE                2,572,551
                    MAGNETIC INDUCTION ACCELERATOR
Filed June 4, 1947                                4 Sheets-Sheet 4

Inventor:
Rolf Wideröe,
By: Pierce, Scheffler & Parker,
Attorneys.

Patented Oct. 23, 1951

2,572,551

UNITED STATES PATENT OFFICE 2,572,551

MAGNETIC INDUCTION ACCELERATOR

Rolf Wideröe, Oslo, Norway, assignor to Aktiengesellschaft Brown, Boveri & Cie, Baden, Switzerland, a joint-stock company Application June 4, 1947, Serial No. 752,467
In Germany September 1, 1943

Section 1, Public Law 690, August 8, 1946
Patent expires September 1, 1963

26 Claims. (Cl. 313—62)

This invention relates to devices for accelerating charged particles such as electrons to high velocity and hence high potential by means of magnetic induction effects. These devices which are often referred to as betatrons or ray transformers include generally an evacuated toroidal tube into which streams of electrons are periodically introduced for acceleration, and a magnetic field system varying with time that has a direction transverse to the plane of the tube and electron motion.

The time-varied magnetic field which is arranged symmetrically with the tube and coaxially therewith affects the electron stream in two ways. First, since the field has a direction transverse to the plane of motion of the electron stream, it tends to hold the electrons and cause them to follow a circular orbit. In the second place, the time-varying magnetic flux enclosed by the orbit of any particular electron necessarily produces an electric field which tends to accelerate that particular electron along the orbit. During one cycle of operation, which will be explained in more detail hereinafter, an incoming electron stream may be constantly accelerated for as many as several hundred thousand turns around the orbit and therefore reaches enormously high velocity and potential at which time the stream can be diverted from the acceleration orbit to produce useful results such as for example to bombard a target anode and produce X-rays.

It has been already rather definitely established mathematically that the radius of the orbit in the tube along which the electron stream will be accelerated depends upon the distribution of the time-varying magnetic field with respect to the tube and such relationship may be expressed mathematically by the equation $$\phi = 2\pi r^2 H_r$$

where $\phi$ is the magnetic flux included within the electron orbit
$r$ is the radius of the electron orbit, and
$H_r$ is the magnetic field strength at the orbit.

It thus follows from the above equation that the electron path will be a circle of such radius $r$ that the total flux within the orbit is twice that which would be produced by a homogeneous magnetic field having an average intensity equal to the field intensity at the orbit extending over the entire area enclosed by the orbit.

Using the above equation as a fundamental basis for engineering design data, it has proven practical to build a magnetic structure and to so locate the toroidal tube with respect to the magnetic field produced by the structure that the acceleration orbit will lie at any desired radial position in the tube, usually the geometrical center. Suitable locations for the electron producing means and the target anode or exit path for the electron stream are then selected either radially inward of, or outward from, the acceleration orbit so that these elements will be entirely clear of any possible interference with the electron stream as it travels round and round in the tube along its orbit.

While from a theoretical point of view, the radius of the acceleration orbit will remain constant despite the increase in the centrifugal forces on the electrons as their velocity increases due to the fact that the Lorentz forces acting radially inward on the circling electrons likewise also increase, it has been found in practical operation that a substantial portion of the total energy content of the electron stream is often lost during the acceleration phase by electrons leaving the orbit and impinging upon the walls of the tube or the electron producing cathode or target anode. This undesirable operating characteristic has been attributed in part to collisions between electrons and stray gas atoms remaining in the tube after the evacuating process which tend to knock the electrons out of the circular orbit, and also to collisions between electrons themselves which are in a state of periodic oscillation while being accelerated along their orbit.

To prevent electron loss, several different remedial measures have been considered but none have been entirely satisfactory. One arrangement has been to so shape the faces of the juxtaposed poles, between which lies the annular tube, that the air gap between these poles increases with increasing distance from the axis of the magnetic flux. Thus the strength of the field diminishes as the radius $r$ from the flux axis becomes larger. If for example, the pole faces have a frusto-conical shape, and the rate of decrease in field strength in the radial direction is less than 1/r, stabilizing forces in both axial and radial directions are set up which tend to drive back any escaping electrons into the predetermined acceleration orbit. It has also been proposed to use certain types of electromagnetic and electrostatic lenses surrounding the acceleration orbit for focussing the circling electron stream but those so far known are incapable of producing fairly uniform stabilizing forces, and thus permitting no substantial increase of the charge brought into the toroidal tube.

The general object of this invention is to provide an improved arrangement for stabilizing the acceleration path in an electron accelerator of the magnetic induction type. An object is to provide for stabilizing the acceleration path of an induction type electron accelerator by subjecting the circling electron stream to a series of closely spaced electric fields, which may either be electrostatic or magnetic in character, extending around the path, the fields alternating in polarity such that adjacent fields in the series are of opposite polarity.

Another object is to provide an electrostatic "lens-path" for stabilizing the circling electron stream along its acceleration path, the "lens-path" being comprised of a series of closely spaced positively and negatively charged electrode rings enclosing the path. Another object is to provide for stabilizing forces on the circling electron stream in a direction parallel to the axis of the main magnetic field by means of a pair of circumferential arrays of radially extending electrodes, the electrode arrays being located on opposite sides of the acceleration path and in parallel planes therewith, and the electrodes of each array alternating in charge potential such that adjacent electrodes are charged to opposite potentials.

Another object is to provide an electromagnetic lens path for a betatron tube comprising a plurality of closely and uniformly spaced coils that enclose the acceleration path, the coils being energized from a source of direct current and so connected that every other coil in the group produces a magnetic field of the same relative direction while adjacent coils produce magnetic fields of opposite direction. Another object is to provide a lens-path for applying stabilizing forces on the swirling electrons in the direction of the flux axis, i. e. normal to plane of the tube, comprising a pair of circumferential arrays or grids of radially extending conductors, preferably located in radially extending slots in the pole faces, the arrays being arranged parallel with the plane of the acceleration orbit and on opposite sides thereof, and each array consisting of a single direct current energized winding wound back and forth across the pole face in the slots such that the conductor current in every other slot is of like direction while the conductor currents in adjacent slots are of opposite direction. Yet another object is to provide stabilizing forces on the electron stream axially of the control poles of a betatron by slotting the faces of the control poles in a radial direction above and below the acceleration orbit so that the strength of the field is alternately strengthened and weakened in the direction of the acceleration orbit.

These and other objects and advantages of the invention will become more apparent from the detailed description of preferred constructional examples which follows when considered with the accompanying drawings.

Referring to the drawings.

Referring now to the form of the invention illustrated in Figs. 1 to 11 wherein the stabilizing force on the electrons is established by means of electrostatic fields, the electron accelerator which is a figure of revolution about the axis $a$—$a$ is seen to include a magnetic field structure 10 made up from radially extending steel laminations of appropriate contour stacked vertically on edge to form a pair of cylindrical poles 11—11' separated by air gap 12 located concentrically along axis $a$—$a$, and a pair of annular poles 13—13' facing one another and separated by air gap 14. Yoke members 15 complete the magnetic circuit for the time-varying magnetic flux set up in the annular and cylindrical poles. Poles 11—11' and 13—13' are surrounded by an annular winding preferably split into two coil sections 16—16' which are wound in the same relative direction and connected in series for energization from an alternating current source 17 of suitable frequency which for example may be 50 cycles/sec. An annular evacuated envelope 18 preferably of glass, rests in the air gap 14 between the annular poles 13—13' and thereby surrounds the axial poles 11—11'. By means of electrical control circuits already known and which therefore need not be shown or described here, streams of electrons are injected periodically into the tube 18 from an electron gun 20 that may be located within the tube proper, or as shown within an arm portion 18a arranged substantially tangentially of the main annular body portion. Electron injection may take place as the magnetic flux produced by windings 16—16' passes through zero in its cycle and the electrons accelerated from their initial injection velocity under the influence of the increasing magnetic flux theoretically follow a truly circular orbit $p$ of constant radius $r$ during the acceleration phase under the combined actions of the induction field through the poles 11—11' and the guiding component of the field acting axially through control poles 13—13' at the orbit. When the electron stream reaches terminal velocity which occurs as the magnetic flux approaches its maximum, the electron stream by other known control circuits is pulled either inwardly or, as illustrated, outwardly from the acceleration orbit $p$ and caused to impinge upon a target anode 21 that may also be located within the tube proper near an inside or outside wall, or as shown, in another substantially tangentially arranged arm portion 18b located approximately 180° away from the entrance arm 18a.

As previously explained, it is most essential to practical operation of electron accelerating devices of the induction type that any electrons which tend to stray from the acceleration orbit be forced back into the circular path. In accordance with the embodiment of the invention shown in Figs. 1 to 11, the electron stabilizing forces are produced electrostatically by means of an annular array of closely and uniformly spaced annular electrodes 22 and 23 located within the tube 18. Electrodes 22 are supported by circular conductive rail 24 which is attached to spaced projections 25 on the inner wall of tube 18, and electrodes 23 are similarly supported by a circular conductive rail 26 that is attached by means of spaced projections 27 to the outer wall of the tube.

Figure 1:
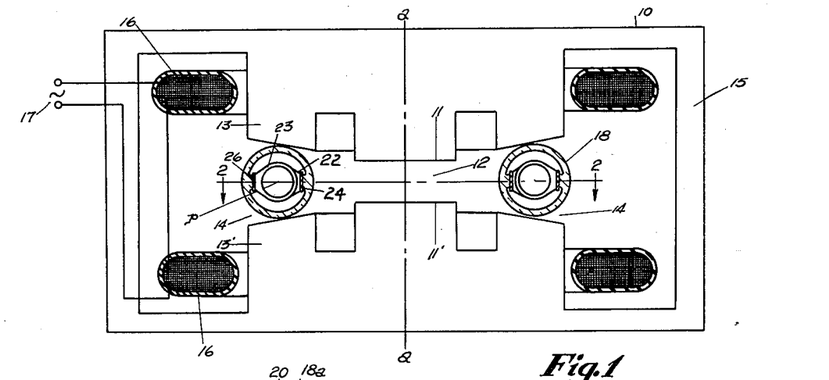
Fig. 1 is a vertical central section of an induction type electron accelerator to which the improved stabilizing lens-path in electrostatic form is applied.
Figure 2:
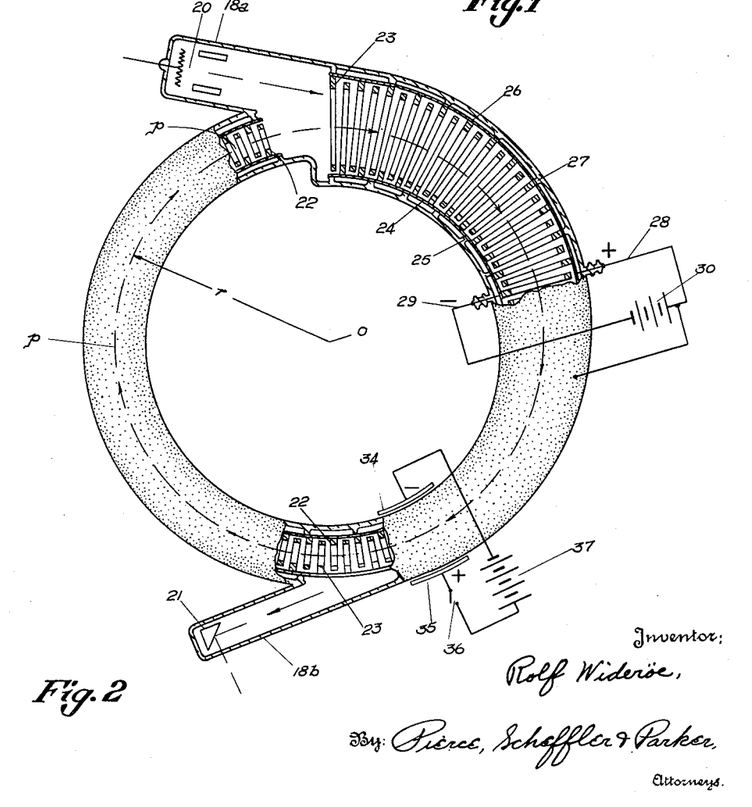
Fig. 2 is a plan view of the tube element of Fig. 1 drawn to a somewhat enlarged scale with parts broken away to show details of construction of the electrostatic rings.

As clearly shown in Fig. 2, annular electrodes 22 extend radially outwardly (with reference to the geometrical center $o$ of tube 18) from rail 24, while electrodes 23 extend radially inward from rail 26. Both sets of electrodes 22 and 23 are so positioned that their geometrical centers coincide with the acceleration orbit $p$, and the spacing between adjacent electrodes is preferably from one fourth to one-half of their inner diameter. Rails 24, 26 are connected by means of conductors 28, 29 across a source of unidirectional potential source such as battery 30 with the result that electrodes 22 supported by the inner rail 24 are charged to one potential (say negative) while the other electrodes 23 sandwiched between electrodes 22 and supported by the outer rail 26 are charged to the opposite potential which in such case would be positive. Thus in proceeding around the acceleration orbit, the electrostatic field of one electrode has a potential opposite to the potential of the fields produced by the electrodes to either side thereof while the respective fields of every other electrode are of like potential.

In order to attain a maximum in stabilizing effect on the electrons following the circular path, the potential between adjacent positively and negatively charged electrodes 23, 22 should be made as large as possible taking into consideration the spacing between the electrodes which on the other hand preferably should be chosen between ¼ and ½ of the inner diameter of the lens electrode to secure the optimum effect on the electrons as they pass through the oppositely charged electrode rings. The applied voltage (that of battery 30) can be brought up to the limits of the value permissible inside of the evacuated tube by providing the exterior wall of tube 18 with a conductive coating 32 charged to a fixed potential, for example at the potential of the positively charged electrodes 23, as shown, or at the potential of the negatively charged electrodes 22 or at an average of these potentials, without any danger of incurring slip discharges on the exterior wall of tube 18.

If the induction accelerator is of such construction that the tube 18 is a true toroid and both the electron gun and target anode are located within the tube, usually on opposite sides radially of the acceleration orbit, all of the electrodes 22, 23 would be of the same size. In the illustrated embodiment, however, with the electron gun 20 located in a branch arm 18a to make it possible to introduce the electron stream from a point far outside of the acceleration orbit, the stabilizing electrodes at the place of electron introduction are made larger in diameter than the other electrodes and therefore produce somewhat weaker electrostatic stabilizing forces than at other places along the circular path $p$ since all of the electrodes are connected to the same source 30. Tube 18 is correspondingly enlarged at this location to house the enlarged electrode rings and it will be seen that the enlarged electrodes are of greatest diameter at the point where the electron stream enters the main body of tube 18 and are gradually reduced in diameter in the direction of travel of the electron stream (which is clockwise as viewed in Fig. 2) until they reach the uniform diameter of the remaining electrodes. As with the electrodes of uniform diameter, the enlarged electrodes are also positioned in such manner that their respective geometrical centers coincide with the orbit $p$, and the plane of each electrode is normal to a tangent at the point of intersection with the orbit.

Considering the electrostatic stabilizing forces of the annular lens-way of Fig. 2 formed by the electrodes 22, 23 as a whole, it will now be apparent that in the direction of electron motion along the orbit $p$ (clockwise), the stabilizing electrostatic field diminishes abruptly at the entrance point of the electron stream where there is a maximum difference in electrode diameters and thereafter increases gradually as the electrodes become smaller in diameter.

Figure 3:
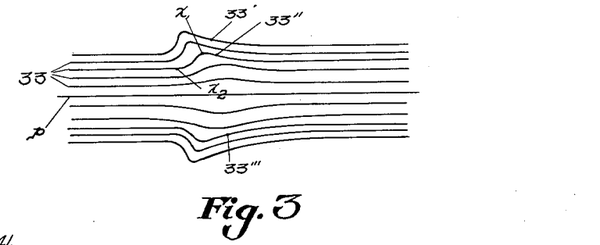
Fig. 3 is a graph showing the distribution of the electrostatic stabilizing forces produced by the electrostatic field in the tube at the place where electron injection takes place.

The effect of enlarging the diameter of the lens-path at the place of electron introduction may be understood by reference to the curves of the electrostatic stabilizing forces as shown in Fig. 3. In this view which shows the electrostatic stabilizing force distribution at the place of introduction, lines 33 are about the equipotential lines of the stabilizing field of force acting on the electrons.

These lines are not however to be mistaken for the equipotential lines of the electrostatic field of the electrode lens-path. An electron introduced into the circular portion of tube 18 from the entrance arm 18a is at first given an acceleration in the direction of introduction, from the moment when it intersects the equipotential line 33' up to the moment when it reaches equipotential line 33". Under the influence of the stabilizing force of the lens-path, it will then describe in one or more revolutions a number of transverse oscillations which extend in a direction perpendicular to a tangent to the equilibrium orbit $p$, in connection with which, inasmuch as the transverse velocity of the electron which was assumed to be zero at point $X_1$, the equipotential line 33''', located below orbit $p$, that has the same but opposite potential as 33", cannot be passed over since on the same, the electron has again assumed a zero transverse velocity. These transverse oscillations that normally would occur entirely undamped, (or with very little damping effect) could lead to the circumstance that, after one or more revolutions, the electron will have described a great number of oscillations, i. e. have reached the point $X_2$. The potential energy of the transverse oscillation that it has at this point is now suddenly diminished by the circumstance that due to the sudden widening that the equipotential lines exhibit at this place, a force with a component lying in the direction of the tangent to the circular path acts on the electron. In this way, the oscillation energy is diminished in favor of an acceleration in the direction of the tangent to the circle, so that the transverse oscillations are damped gradually by frequent repetition of this operation. It is seen therefore that the increase in diameter of the electrode lens at the place of electron introduction has two different effects. The first effect is that the possibility is obtained of introducing a stream of electrons into the circular path and yet filling the whole circumference of the tube with electrostatic lenses. The second effect is that the transverse oscillations described by the electrons introduced into the circular path are damped gradually during subsequent turns of the electrons about the orbit.

In the illustrated embodiment, where the target anode 21 is located in an arm 18b, provision must be made for causing the electron stream to be pulled radially outward upon reaching its terminal velocity so that it will enter the tangentially arranged tube arm 18b. For this purpose, a pair of plate electrodes 34—35 are placed on opposite sides of the circular path $p$ slightly in advance of the entrance to arm 18b. Plates 34—35 are preferably located exteriorly of tube 18 and are connected through a switch 36 to opposite terminals of a direct current source 37. By a suitable control circuit operated in timed relation with the time-varied magnetic field, switch 36 is closed at the approximate instant when the electron stream has reached its desired ultimate velocity, to establish an auxiliary electrostatic field whose polarity is indicated on the drawing by conventional symbols, the potential of the outer plate 35 being positive with respect to that of the inner plate 34. If the electrodes 22—23 of the lens-way in the tube are made from a resistance material, or consist of very thin metallic coatings applied to a base of insulating material, the equivalent circuit existing between the plate electrodes 34—35 at the instant when switch 36 is closed can be shown as in Fig. 4. In this view, the equivalent circuit is seen to be comprised of three series connected condensers 38, 39, 40, and a resistance 41 connected in parallel with condenser 39. The outer plates of the condensers 38 and 40 correspond to electrode plates 35 and 34, respectively.

Figure 4:
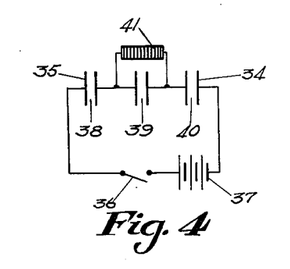
Fig. 4 is a circuit diagram of an auxiliary electrostatic field device shown in Fig. 2 for pulling the electron stream outwardly from the acceleration orbit when the stream has reached its ultimate velocity.
Figure 5:
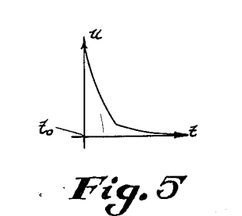
Fig. 5 is a curve showing the discharge characteristic of the auxiliary electrostatic field device.

The plates of condensers 38 and 40, opposite to each other at the time, correspond to that portion of the electrostatic lens-way that is directly adjacent to the plates 35 and 34. The two plates of condenser 39 are identical with the above-mentioned parts of the electrode lens-way, while the resistance 41 corresponds to that part of the lens electrodes that connects the parts located opposite plates 35 and 34. When the potential of battery 37 is applied by closing switch 36, then the potentials on the condensers 38, 39 and 40 divide up at the first instant according to their capacity. Condenser 39 then discharges itself again rapidly through the resistance 41, as pictured in the curve of Fig. 5 in which, at time $t_0$, the switch 36 may be closed and $u$ indicates the voltage at condenser 39 so that the charge on this condenser disappears again rapidly and the electron stream is led out of the circular part although this circular path through the lens electrodes 22, 23 appears to be screened from electrostatic influence by means of plates located outside the lens electrodes. Since the whole electron contents of the circular path passes between the plates 34 and 35 in a very short time, the voltage on the plates for the deflecting operation can be assumed to be practically constant, in spite of the discharge through resistor 41.

Figure 6:
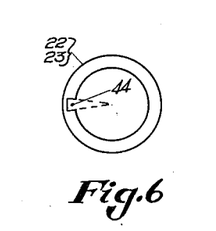
Figs. 6 to 11 are essentially elevation views illustrating various constructions for the electrostatic lens rings adjacent the exit arm of the tube of Fig. 2 to permit passage of the electron stream into the arm.
Figure 7:
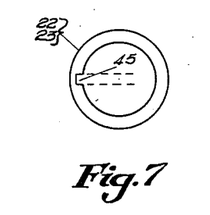
Figure 8:
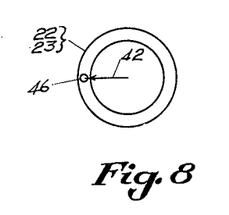

Besides the deflecting field established between plates 34 and 35 for leading the electron stream out of the main body of tube 18 into the exit branch arm 18b, it will be seen from Fig. 2 that the lens electrodes 22, 23 in the vicinity of the entrance to the exit arm 18b must be modified to permit passage of the electron stream therethrough as it is pulled away from the acceleration orbit $p$ to avoid impingement against the inner edges of the lens electrodes. According to the invention, each of the lens electrodes having any portion thereof lying within the exit path of the electron stream is cut away at such portion so that the electron stream can pass unimpeded. The cuts in the lens electrodes may take several different forms and a few suitable configurations are shown in Figs. 6 to 11. In Fig. 6, the one or more lens electrodes 22, 23 which lie in the path of the electron stream are slotted outwardly from the inner edge at 44, the side faces of the slots extending radially from the center of the electrode. In Fig. 7 the side faces of the slots 45 in the lens electrodes are parallel to the radial line extending through the center of the slot. In Fig. 8 the lens electrodes are provided with a hole 46 which is located at the point where the electron beam which is deflected outwardly would impinge on the lens electrode in question. The distance 42 of the hole from the normal orbit of the electrons thus differs for the various lens electrodes, so that the hole 46 "wanders" from the inner to the outer edge of the various lens electrodes 22, 23 when moving along the lens path in the direction of the movement of the electrons.

Figure 9:
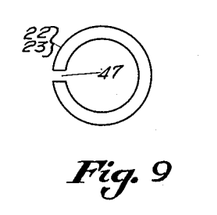

In Fig. 9, the passageway through the lens electrodes 22, 23 is formed by removing a small section of the electrode, to form an open and generally radial gap 47 between the inner and outer end faces of the electrode. The sides of the gap 47 may as shown be parallel as in the Fig. 7 structure, or they may extend radially as in the Fig. 6 construction.

Figure 10:
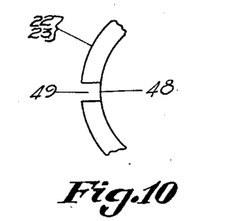

If desired, the opening at the inner edge of the slots formed in the electrodes 22, 23 to permit passage of the electron stream may be bridged by a wire 48 of small diameter having a curvature conforming to the inner edge of the electrode as shown in Fig. 10. As illustrated, the gap 49 in Fig. 10 conforms to the particular slot arrangement shown in Fig. 9 but it is to be understood that the slot constructions of Figs. 6 and 7 may also be provided with a wire bridging the inner edges of the slot.

Figure 11:
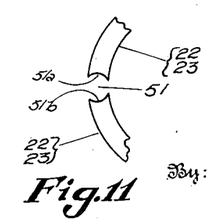

In Fig. 11, the passageway 51 is also an open gap as in Fig. 9 but the enclosing side edges 51a—51b of the gap are curved to produce an operating characteristic equivalent to that which results from the use of the bridging wire 48.

The side edges of the slot constructions shown in Figs. 6 and 7 may also be curved. When the electrons pass through the lens electrode, which are alternately charged to opposite potentials, their speed is alternately increased or reduced. At the same time also an alternating radial component of the electric field occurs, acting alternately inwardly and outwardly. The electrons thus execute a radial oscillation with the frequency of the lens electrodes. Since the electrons are, however, due to the modulated longitudinal velocity, subjected for a longer time to an inwardly directed radial force, than to the outwardly acting force the result is that on the average there will be an inwardly directed stabilizing force acting on the electrons.

Figure 12:
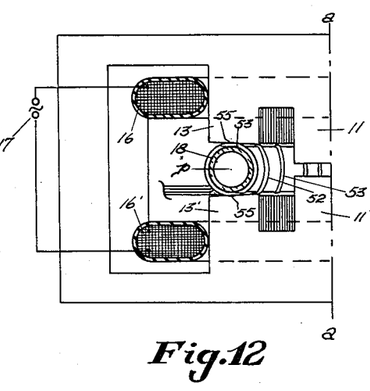
Fig. 12 is a half vertical section of an electron accelerator in which electron stabilization is effected by means of an electromagnetic lens-path.

According to another embodiment of the invention as shown in Fig. 12, the electron stream can be stabilized along its acceleration orbit $p$ by means of an electromagnetic lens-path located exteriorly of the tube 18 and may be preferable to the electrostatic lens-path previously described if it is found impractical in certain cases because of spacial limitations to accommodate the electrodes 22, 23 within the tube. For example, the electron accelerating apparatus is often constructed with the electron emissive cathode and/or target anode located within the annular tube rather than in tangentially arranged arm portions as shown in Fig. 2. The use of an externally located lens-way is then obviously to be preferred.

Figure 13:
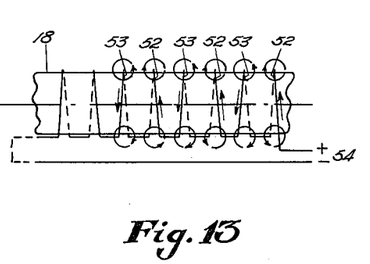
Fig. 13 is a development of a portion of the tube and coils of Fig. 12.

Referring now to Figs. 12 and 13, the electromagnetic lens-way is seen to be comprised of a series of closely spaced coils 52, 53, surrounding the tube 18. These coils which may consist of one or more turns are positioned in radial planes and enclose the entire circumference of the tube, and the magnetic field produced by any one coil is to have a direction opposite to that produced by the next adjacent coil. The coils may be formed as separate windings with suitable connections to a source of current or, as illustrated in Fig. 13, the coils may be formed by a single winding energized from a direct current source 54. Beginning at any convenient location around the tube 18, and looking into the tube from the right as it appears in Fig. 13, coil 52 is formed by a plurality of turns of the winding in a clockwise direction about tube 18; the next adjacent coil 53 is formed by a similar number of turns of the winding in a counter-clockwise direction about the tube. The turns for the next coil are clockwise, etc. until the entire orbital path is enclosed by the coils. To simplify illustration in Fig. 13, each coil is shown as being comprised of one turn only, but in actual practice each coil might contain many turns wound in the form of a short cylinder.

As seen in Fig. 13, the current through each of the coils 52 will then be in a clockwise direction about the tube while the current flow through the adjacent coils 53 will be in a counterclockwise direction. Thus the magnetic fields produced respectively by adjacent coils in the series will have opposite directions as indicated by the circular arrows, which is the result desired.

As shown in Fig. 12, the faces of the control poles 13—13' may be provided with radial grooves 55 to accommodate the substantially radial portions of the coils 52, 53 where it is desirable to limit dimensions in the direction of the axis $a$—$a$. Embedding the coils 52, 53 in grooves in the pole faces may also be advantageous because of the fact that the field strength of the coils will be greater in the neighborhood of the surfaces of control poles 13—13' than in the space between the poles due to the presence of the iron. Thus stronger stabilizing forces are formed in the direction of the axis $a$—$a$ than in the radial direction and the electrons will therefore tend to distribute themselves in approximately an elliptically shaped stream within the tube. The major axis of the ellipse will therefore extend in a radial direction and the minor axis in the axial direction. Considering the fact that it may be desirable in some cases to construct the tube in such manner that the distance between the tube walls is greater in the radial direction than in an axial direction, the elliptical distribution of the electron stream is thus very desirable.

As was the case with the electrostatic lens-path previously described, the coils 52, 53 should be closely spaced around the tube 18, the distance between the centers of adjacent coils being made as great as possible with regard to the radial oscillations of the electrons produced by the lens path. The maximum permissible axial length of the cylindrical coils as measured along the orbit $p$, taking into consideration the amplitude of the radial oscillation of the electrons to be permitted, will be dependent upon the speed at which the electrons are shot into the tube and specifically the coil length will be proportional to the square root of the feed-in voltage of the electrons. The axial length of the coil will also depend upon the energizing current and will vary inversely with the magnitude of the current. Thus for example, assuming suitable dimensions are selected for the diameter of the tube 18 and for the diameter of coils 52, 53, the maximum length $l$ in centimeters of the coils can be determined by the equation $$l_{max} = \frac{470}{\theta}\sqrt{U} \text{ cm.}$$

where

U is the feed-in voltage of the electrons in kv.; and $\theta$ is the energization of the coil in ampere-turns per centimeter.

Assuming an energization factor of 200 ampere turns/cm. and an injection voltage of 10 kv., the maximum permissible length of the coil as measured along the orbit $p$ would be 7.4 cm.

As can be seen from Fig. 13, inside the oppositely excited coils both radial and longitudinal (referred to the direction of the electron paths) components of the magnetic induction are produced. The radial field components together with the longitudinal movement of the electrons, produce spatial periodic alternating Lorentz forces parallel to the direction of rotation of the electrons moving in the conductors of the lens-coils. These forces will produce a superposed periodic azimuth oscillation of the electrons in the same direction as the forces. This azimuth movement of the electrons in conjunction with the longitudinal field components of the magnetic lens fields in turn results in periodically varying Lorentz forces, which are always directed inwardly and thus always have a stabilizing effect on the electrons. It can be proved that the inwardly acting Lorentz forces will be approximately twice as great as the outwardly directed centrifugal forces acting on the periodically swinging electrons the result being therefore a considerable stabilizing force produced by the magnetic lens path.

Coils 52, 53 may be energized continuously during the operation of the electron accelerating apparatus to stabilize the circling electron stream along its orbit p, or if desired, to prevent overheating, satisfactory stabilizing effects can be obtained by bringing the strength of the energizing current up to a predetermined maximum value dependent upon the size of the wire, insulation, etc., at the beginning of the acceleration period and thereafter diminishing the current to a lower value. If suitable control circuits are provided for varying the energizing current with time, it will be necessary to take measures to prevent eddy currents from being set up in the radially extending laminations of the control poles 13, 13' by induction because of the presence of the time-varying magnetic field of the coils 52, 53 in the pole laminations.

Figure 14:
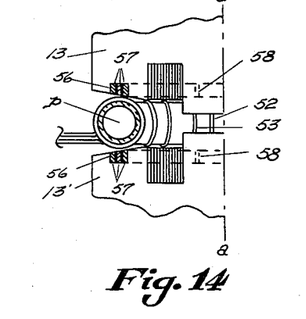
Fig. 14 is a fragmentary vertical section of a modified construction including a plurality of rings for breaking up eddy currents induced in the control poles by the stabilizing coils, when the coils are excited by a varying current.
Figure 15:
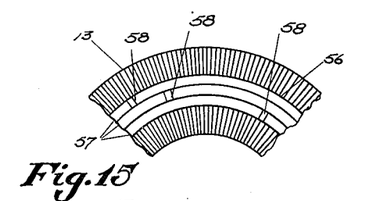
Fig. 15 is a fragmentary plan view of one of the control poles of the Fig. 14 construction.
Figure 16:
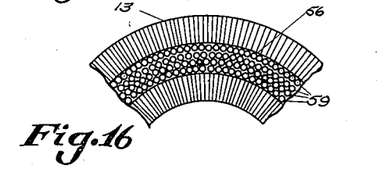
Fig. 16 is also a fragmentary plan view of one of the control poles showing a modified arrangement for reducing eddy currents in the poles.

To prevent these induced eddy currents, an annular recess 56 may be provided in the face of each of the laminated control poles 13, 13' as shown in Fig. 14, and the recess filled by a plurality of circular insulated iron sheets 57 placed perpendicular to the plane of the acceleration orbit p and concentric therewith. The plates preferably have at least one gap 58 in their circumference so as not to form single turn short-circuited windings for the main induction flux set up by windings 16, 16'. Another suitable arrangement would be to substitute a spirally wound flat iron strip in the recess 56 for the series of circular plates. Still another way in which to prevent eddy currents from being set up in the pole laminations by induction from the time-varying current in the stabilizing coils 52, 53 would be to fill the annular recess 56 with short pieces of insulated iron-wire 59 arranged parallel with the axis a—a as shown in Fig. 16.

Figure 17:
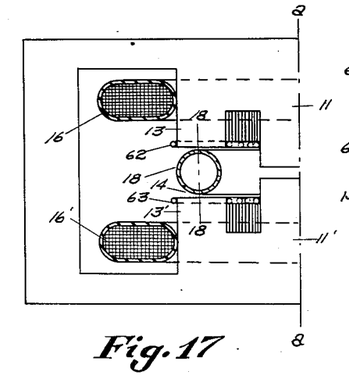
Fig. 17 is a half vertical section of an induction accelerator showing a modified form of electromagnetic lens in which a winding is wound back and forth across the face of each pole in radially extending slots and produces a stabilizing effect on the electron stream in an axial direction.
Figure 18:
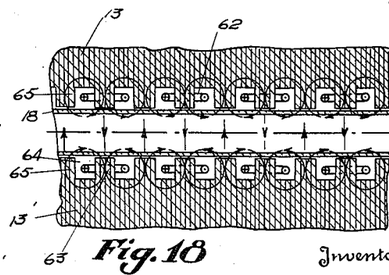
Fig. 18 is a fragmentary development view of a vertical section on line 18—18 of Fig. 17 showing the arrangement of the meandering winding in the faces of both the upper and lower control poles.

If the electron accelerator be constructed in such manner that the radial gradient of the main magnetic field produced by windings 16—16' remains constant with increasing radius, or even rises, at the air gap between the control poles 13—13', as distinguished from a decreasing gradient, the radial component of the stabilizing force acting on the circling electron stream due to this field becomes stronger but the axial component of this force disappears or becomes negative. In accordance with this invention, a positive stabilizing force in the direction of the axis a—a of the induction acceleration can be obtained by modifying the construction of the coils 52, 53 so as to retain only those sections of the coils which lie in a substantially radial direction. Referring now to Figs. 17 and 18, it will be seen that the faces of the control poles 13—13' are parallel rather than divergent as in the other constructions thus maintaining a substantially uniform flux density in the air gap 14 between the control poles 13—13', and that the series of coils 52, 53 formerly used is replaced with a pair of windings 62, 63 wound back and forth across the faces of the poles 13, 13'. The windings may be placed in radially extending slots 64 in the faces of the poles to facilitate installation and it will be obvious from Fig. 18 that when each winding is energized from a direct current source, the current will flow in opposite directions in adjacent slots, i. e. the direction of the current in one slot will be radially outward while the current in the next adjacent slot will have a radially inward direction. The currents flowing respectively in the windings 62, 63 across the ends of the slots can be disregarded and hence the respective magnetic fields produced by the current in adjacent slots are of opposite polarity and form an electromagnetic grid extending around the tube 18. The slots in the face of the lower pole 13' are aligned with those in the upper pole 13 and, as shown in Fig. 18, current flows through the conductors of any pair of upper and lower aligned slots in the same direction. Hence the magnetic field produced by any conductor in the lower pole face is opposite in direction to the field produced by the conductor in the slot immediately above it in the upper pole face.

The directions of the magnetic fields produced by the windings 62, 63 are shown by the circular arrows in Fig. 18, and the result of the arrangement is to set up a series of magnetic fields transversely of tube 18, the polarities of which alternate in axial direction progressively along the orbit p. Thus the field between one set of aligned teeth in the pole faces is axially upward while the field between the next adjacent set of teeth is axially downward as shown by the axial arrows, etc. The electromagnetic grid shown in Figs. 17 and 18 operates in exactly the same manner as a magnetic lens path where the lens coils are greatly enlarged in a radial direction (i. e. perpendicular to 18—18 in Fig. 17), so that only the lens forces acting in the axial direction become effective (magnetic cylinder lenses). The electrons, due to the axial components of the magnetised lens fields, thus execute a superposed radial oscillation (i. e. perpendicular to 18—18 in Fig. 17) and this radial movement in conjunction with the longitudinal magnetic field components produces a periodic alternating force which is always directed downwards thus stabilizing the swirling electrons in the axial direction (i. e. parallel to 18—18 in Fig. 17).

Figure 19:
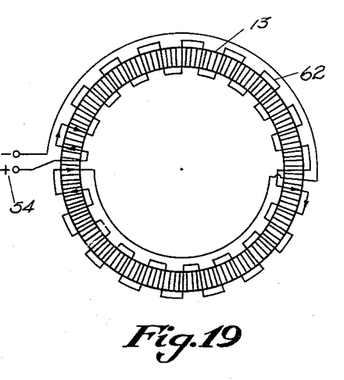
Figs. 19 and 20 are schematic diagrams illustrating alternative arrangements for energizing the windings of Fig. 17.
Figure 20:
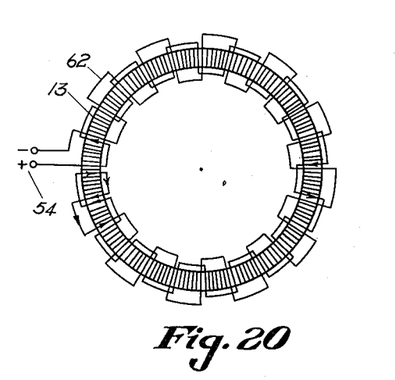

In order that no alternating voltage shall be induced in the cylindrical windings 62, 63 of Figs. 17 and 18 by the main time-varied magnetic field, each of these windings can be made bi-filar as shown in Fig. 19 so that the windings do not enclose the induction flux. The winding arrangement according to Fig. 19 has at the same time the characteristic that the electromotive forces that occur in the upper and lower lens windings because of the time-varied control field nullify each other; consequently no alternating current of the frequency of the control and induction flux components of the main time-varied field occurs between the direct current input terminals. Fig. 20 shows a somewhat different arrangement for winding each of the electromagnetic grids 62, 63. In function, it is equivalent to the Fig. 19 arrangement but has the advantage in that it avoids the conductor crossing place seen at the right in Fig. 19 and is also to be preferred when more than one conductor is placed in each radial slot in the pole face, there being two such conductors per slot shown in Fig. 20.

Figure 23:
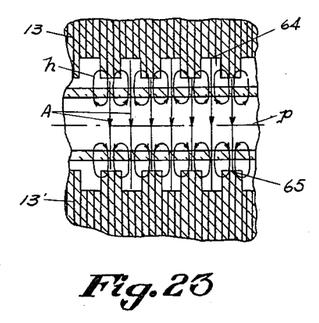
Fig. 23 is likewise a vertical section in development of still another modified construction for obtaining an electromagnetic stabilizing force for the electron stream that is dominant in the axial direction.

The equivalent in function of the electromagnetic grids 62, 63 in Figs. 17 and 18 may as shown in Fig. 23 be effected by means of the radially aligned slots 64 alone in the faces of the upper and lower annular control poles 13—13', which causes the main time-varied field produced by windings 16—16' in these poles to be alternately strengthened and weakened along the electron orbit. The magnetic field then resulting can be conceived as an equally strong field A at first extending over the whole surface of the control poles 13—13', and an additional field $h$ is imposed upon the same that has the same direction as field A at the places where two teeth 65 are opposite but has the opposite direction at the places where two slots 64 are opposite each other. The directions of these opposed fields are shown in Fig. 23 by the circular arrows.

The arrangement of Figs. 17, 18 wherein the stabilizing field is produced by windings laid in radial grooves in the pole faces is however to be preferred because the windings can be energized to full strength from the beginning of the acceleration period, whereas the stabilizing field in the direction of the axis produced by the radial grooves in conjunction with the time-varied main magnetic field rises with the change in the latter and hence has but little or no stabilizing effect at the beginning of the acceleration period.

Figure 21:
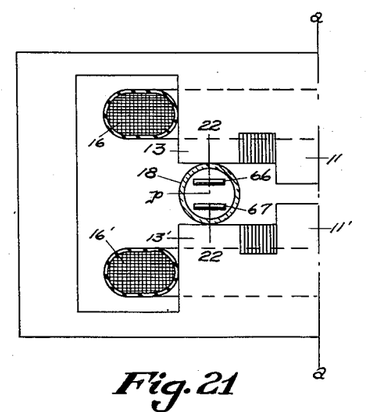
Fig. 21 is a half vertical section of an induction type electron accelerator illustrating a modified construction for producing a stabilizing effect on the electron stream dominant in an axial direction by means of juxtaposed arrays of radially extending rod electrodes.
Figure 22:
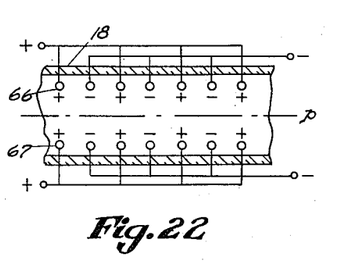
Fig. 22 is a vertical section in development taken along line 22—22 of Fig. 21.

Another arrangement for producing axial stabilizing forces is shown in Figs. 21 and 22 and comprises upper and lower circular electrostatic grids arranged inside of the tube 18 and parallel with the plane of the acceleration orbit $p$. The grids which are of identical construction are made up of circular arrays of closely spaced, radially extending, rod electrodes 66, 67. The electrodes of each grid which are in vertical alignment are connected in parallel to a source of direct current and the connections are so arranged that adjacently disposed electrodes are charged to opposite potential while every third electrode has the same potential. The potentials to which the electrodes are charged are designated by the usual electrical symbols and it will be seen that correspondingly aligned electrodes of the upper and lower grids have like potentials. The axial stabilizing effect of the electrostatic grids 66, 67 on an electron moving along the acceleration path $p$ is similar to that produced by the electromagnetic grids 62, 63 in Figs. 17, 18 and hence need not be repeated.

I claim:

1. The combination with a magnetic induction accelerator including a closed tube providing therein a circular path along which charged particles may travel, and means including juxtaposed poles with their axes coincident with the axis of said path for producing a time-varied magnetic field linking the path to thereby cause the particles to be accelerated along the path, of a lens-path comprising a plurality of closely spaced electric lenses extending around said path for stabilizing the particles in the circular path during their acceleration, and means for energizing said lenses from a source of unidirectional potential in such manner that the fields produced respectively by adjacent lenses in said lens-path are of opposite polarity.

2. The combination with a magnetic induction accelerator including a closed tube providing therein a circular path along which charged particles may travel, and means including juxtaposed poles with their axes coincident with the axis of the circular path for producing a time-varied magnetic field linking the path to thereby cause the particles to be accelerated along the path, of an electrostatic lens-path for stabilizing said particles during acceleration, said lens-path comprising a plurality of closely spaced annular electrodes enclosing said circular path and arranged concentric therewith and being disposed in substantially radial planes, and means for charging said electrodes from a source of unidirectional potential in such manner that adjacent electrodes in said lens-path are charged respectively to opposite polarities.

3. The invention as defined in claim 2 wherein the ring electrodes have a spacing equal to $\frac{1}{4}-\frac{1}{2}$ their internal diameter.

4. The invention as defined in claim 2 wherein said electrodes are disposed inside of the tube, and the exterior of said tube is provided with a conductive coating at a fixed potential relative to that of said electrodes.

5. The invention as defined in claim 2 wherein the tube is provided with a generally tangential arm portion through which the charged particles are injected for acceleration, and the inner diameters of said electrodes enlarged abruptly at the entrance point diminish gradually in the direction of travel of the particles.

6. The invention as defined in claim 2 wherein the lens electrodes comprise resistance material and outside the lens electrodes special deflecting electrodes are located for bringing the electrons out of said circular path.

7. The invention as defined in claim 2 and which further includes means establishing an electric field transversely of said circular path at a preselected point thereon for ejecting the particles from the acceleration path radially outward of said electrodes, and said electrodes in the vicinity of the ejection point are apertured to permit passage of the particles.

8. The invention as defined in claim 7, wherein the apertures in the electrodes are each constituted by a substantially radial gap extending between the inner and outer peripheries of said electrode, and which further includes a thin wire ridging said gap at the inner periphery of said electrode.

9. The combination with a magnetic induction accelerator including a closed tube providing therein a circular path along which charged particles may travel, and means including juxtaposed poles with their axes coincident with the axis of said circular path for producing a time-varied magnetic field linking the path to thereby cause the particles to be accelerated along the path, of an electrostatic lens-path for stabilizing the particles during acceleration, said lens-path comprising a plurality of closely spaced annular electrodes enclosing said circular path, means supporting said electrodes within said tube concentrically with said path and in radial planes, and means for charging said electrodes from a source of unidirectional potential in such manner that adjacent electrodes in said lens-path are charged respectively to opposite polarities.

10. The invention as defined in claim 9 wherein the electrode supporting means is comprised of an inner conductive rail supporting all the electrodes of one potential, and an outer conductive rail supporting all the electrodes of opposite potential.

11. The combination with a magnetic induction accelerator including a closed tube providing therein a circular path along which charged particles may travel, and means including juxtaposed poles with their axes coincident with the axis of the circular path for providing a time-varied magnetic field linking the path to thereby cause the particles to be accelerated along the path, of a magnetic lens-path for stabilizing said particles during acceleration, said lens-path comprising a plurality of closely spaced magnetic lenses extending around said circular path and arranged concentric therewith and being disposed in substantially radial planes, and means for energizing said lenses from a source of unidirectional potential in such manner that the magnetic fields produced respectively by adjacent lenses in said lens-path are of opposite polarity.

12. The invention as defined in claim 11 wherein the strength of the fields produced by said lenses is variable.

13. The invention as defined in claim 11 wherein said lenses are disposed exteriorly of said tube and the pole faces contain radially extending grooves for receiving corresponding portions of said lenses.

14. The invention as defined in claim 11 wherein each of said magnetic lenses is produced by a coil, said coils being energized only during that part of the accelerating period in which the stabilizing forces produced by the magnetic control field are small.

15. The invention as defined in claim 14 wherein the pole portions adjacent said lenses are laminated radially and are provided with circumferential grooves containing axially extending ferromagnetic inserts.

16. The invention as defined in claim 14 wherein the pole portions adjacent said lenses are laminated radially and are provided with circumferential grooves containing ferromagnetic rings having at least one gap in their circumference.

17. The invention as defined in claim 14 wherein the inserts consist of short pieces of wire lying in the direction of the flux producing the magnetic guide field.

18. The combination with a magnetic induction accelerator including a closed tube providing therein a circular path along which charged particles may travel, and means including juxtaposed poles with their axes coincident with the axis of the circular path for producing a time-varied magnetic field linking the path to thereby cause the particles to be accelerated along the path, of an electromagnetic lens-path for stabilizing said particles during acceleration, said lens-path comprising a plurality of closely spaced electromagnetic lenses enclosing said circular path and arranged concentric therewith and being disposed in substantially radial planes, and means for energizing said lenses from a source of unidirectional potential in such manner that the magnetic fields produced respectively by adjacent lenses in said lens-path are of opposite polarity.

19. The invention as defined in claim 11 wherein said electromagnetic lenses are formed from a continuous winding and adjacent lenses have opposite winding directions to thereby produce magnetic fields of opposite polarity.

20. The invention as defined in claim 11 wherein each of said magnetic lenses is produced by a coil and the axial dimension of each said coil as measured in the direction of said circular path does not exceed the value $$\frac{470.\sqrt{U}}{\theta} \text{ cm.}$$

where U is the injection voltage of the electrons in kv. and $\theta$ the excitation of the lens coils in ampere turns/cm.

21. The combination with a magnetic induction accelerator including a closed tube providing therein a circular path along which charged particles may travel, and means including juxtaposed poles with the axes coincident with the axis of said circular path for producing a time-varied magnetic field linking the path to thereby cause the particles to be accelerated along the path, of annular electromagnetic grids positioned above and below the path for stabilizing said particles in an axial direction, each said grid being comprised of closely spaced and radially extending conductors, means energizing said conductors from a source of unidirectional potential in such manner that the direction of current flow in one conductor is opposite to that in the conductors adjacent thereto, the conductors of both grids being in axial alignment and correspondingly aligned conductors carry currents of like direction.

22. The invention as defined in claim 21 wherein the face portions of said poles adjacent the circular path are provided with radially extending grooves, and each grid is formed by a continuous winding wound back and forth across the pole faces in said grooves.

23. The invention as defined in claim 22 wherein each of said windings is arranged in non-inductive relation with respect to the time-varied magnetic field enclosed by the circular path.

24. The combination with a magnetic induction accelerator including a closed tube providing therein a circular path along which charged particles may travel, and means including juxtaposed poles with their axes coincident with the axis of said circular path for producing a time-varied magnetic field linking the path to thereby cause the particles to be accelerated along the path, of annular magnetic grids positioned above and below the path for stabilizing the particles in an axial direction, each said grid being formed by closely spaced grooves extending radially in the face portions of said poles, the grooves in the upper and lower poles being axially aligned.

25. The combination with a magnetic induction accelerator including a closed tube providing therein a circular path along which charged particles may travel, and means including juxtaposed poles with their axes coincident with the axis of said circular path for producing a time-varied magnetic field linking the path to thereby cause the particles to be accelerated along the path, of annular electrostatic grids positioned above and below the path for stabilizing said particles in an axial direction, each said grid being comprised of closely spaced and radially extending electrodes, the electrodes of both grids being in axial alignment, means for charging said electrodes from a source of unidirectional potential in such manner that adjacent electrodes in each grid are charged respectively to opposite polarities and correspondingly aligned electrodes of the two grids being charged to like potential.

26. A device for stabilizing a stream of charged particles adapted to be accelerated along a closed path comprising a lens-path constituted by a plurality of closely spaced electric lenses extending around said path, and means for energizing said lenses from a source of unidirectional potential in such manner that the electric fields produced respectively by adjacent lenses in said lens-path are of opposite polarity.

ROLF WIDERÖE.

REFERENCES CITED

The following references are of record in the file of this patent:

UNITED STATES PATENTS

| Number | Name | Date |
|---|---|---|
| 2,153,190 | Hollmann | Apr. 4, 1939 |
| 2,229,572 | Jonas | Jan. 21, 1941 |
| 2,245,670 | Hollmann | June 17, 1941 |
| 2,297,305 | Kerst | Sept. 29, 1942 |
| 2,299,792 | Bouwers et al. | Oct. 27, 1942 |
| 2,473,477 | Smith | June 14, 1949 |
| 2,480,169 | Westendorp | Aug. 30, 1949 |